(12) United States Patent
Lyle

(10) Patent No.: US 6,343,293 B1
(45) Date of Patent: Jan. 29, 2002

(54) STORING THE UNCOMPRESSED DATA LENGTH IN A LOB MAP TO SPEED SUBSTRING ACCESS WITHIN A LOB VALUE

(75) Inventor: Robert William Lyle, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/322,292

(22) Filed: May 28, 1999

Related U.S. Application Data (60) Provisional application No. 60/101,729, filed on Sep. 24, 1998.

(51) Int. Cl.$^7$ .............................. G06F 17/00; G06F 7/00
(52) U.S. Cl. ........................................................ 707/101
(58) Field of Search ................................ 707/101, 201, 707/1

(56) References Cited

U.S. PATENT DOCUMENTS

| | | | |
|---|---|---|---|
| 4,509,119 A | 4/1985 | Gumaer et al. ............ 364/200 |
| 4,949,388 A | 8/1990 | Bhaskaran .................. 382/10 |
| 4,961,134 A | 10/1990 | Crus et al. .................. 364/200 |
| 5,043,866 A | 8/1991 | Myre, Jr. et al. ........... 395/200 |
| 5,222,235 A | 6/1993 | Hintz et al. ................. 395/600 |
| 5,247,672 A | 9/1993 | Mohan ....................... 395/650 |
| 5,261,088 A | 11/1993 | Baird et al. ................. 395/600 |
| 5,291,583 A | 3/1994 | Bapat ......................... 395/500 |
| 5,295,188 A | 3/1994 | Wilson et al. ............... 380/38 |
| 5,396,623 A | 3/1995 | McCall et al. .............. 395/600 |
| 5,408,654 A | 4/1995 | Barry ......................... 395/600 |
| 5,416,915 A | 5/1995 | Mattson et al. ............. 395/425 |
| 5,418,921 A | 5/1995 | Cortney et al. ............. 395/425 |
| 5,418,940 A | 5/1995 | Mohan ....................... 395/575 |
| 5,435,004 A | 7/1995 | Cox et al. ................... 395/575 |
| 5,445,944 A | 8/1995 | Haderle et al. ............. 395/600 |
| 5,452,299 A | 9/1995 | Thessin et al. ............. 370/62 |
| 5,481,701 A | * | 1/1996 | Chambers, IV ............. 395/600 |
| 5,506,580 A | * | 4/1996 | Whiting et al. ............. 341/51 |
| 5,517,641 A | 5/1996 | Barry et al. ................. 395/600 |
| 5,551,020 A | * | 8/1996 | Flax et al. ................... 395/600 |
| 5,566,329 A | 10/1996 | Gainer et al. ............... 395/600 |
| 5,579,499 A | 11/1996 | Fecteau et al. ............. 395/419 |
| 5,579,515 A | 11/1996 | Hintz et al. ................. 395/607 |
| 5,630,093 A | 5/1997 | Holzhammer et al. ...... 395/442 |
| 5,666,560 A | 9/1997 | Moertl et al. ............... 395/888 |
| 5,684,986 A | 11/1997 | Moertl et al. ............... 395/612 |
| 5,687,343 A | 11/1997 | Fecteau et al. ............. 395/412 |
| 5,721,915 A | 2/1998 | Sockut et al. ............... 395/616 |

(List continued on next page.)

FOREIGN PATENT DOCUMENTS

JP 8-167852 6/1996

OTHER PUBLICATIONS

IBM Technical Disclosure Bulletin, "Method For Storing Large Objects in a Relational Database," vol. 35, No. 4A, pp. 72–75, Sep. 1992.

(List continued on next page.)

*Primary Examiner*—John Breene
*Assistant Examiner*—Susan Rayyan
(74) *Attorney, Agent, or Firm*—Sughrue Mion, PLLC

(57) ABSTRACT

A method, apparatus, and article of manufacture for retrieving data in a computer. In accordance with the present invention, large object data is compressed until the large object data fits within one data page. An uncompressed large object data length is stored in a large object map, wherein the stored uncompressed large object data length is associated with the compressed large object data. A portion of the compressed large object data is located for performing a data processing function by using the stored uncompressed large object data length. The portion of the large object data is stored in the database.

24 Claims, 5 Drawing Sheets

U.S. PATENT DOCUMENTS

| | | | | |
|---|---|---|---|---|
| 5,727,197 | A | 3/1998 | Burgess et al. | 395/602 |
| 5,732,402 | A | 3/1998 | Lehman | 707/205 |
| 5,737,601 | A | 4/1998 | Jain et al. | 395/617 |
| 5,742,806 | A | 4/1998 | Reiner et al. | 395/600 |
| 5,742,810 | A | 4/1998 | Ng et al. | 395/604 |
| 5,758,357 | A | 5/1998 | Barry et al. | 707/202 |
| 5,761,667 | A | 6/1998 | Koeppen | 707/101 |
| 6,112,024 | A * | 8/2000 | Almond et al. | 395/70 |

OTHER PUBLICATIONS

IBM Technical Disclosure Bulletin, "Reorganization Flags For Table Indexes," vol. 35, No. 5, pp. 156–157, Oct. 1992.

IBM Technical Disclosure Bulletin, "Technique to Allow DB2 Utilities and Commands to Run While SQL Applications Have a Table Space Locked," vol. 36, No. 09A, pp. 499–501, Sep. 1993.

IBM Technical Disclosure Bulletin, "Spanning Temporary Reorg Files," vol. 36, N. 06A, p. 159, Jun. 1993.

IBM Technical Disclosure Bulletin, "Segmented Relational Database Tables," vol., 38, No. 07, pp. 219–220, Jul. 1995.

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996 Considered abstract.

MJ Carey, et al., "Object And File Management in the EXODUS Extensible Database System," Proceedings of Very Large Data Bases. Twelfth International Conference on Very Large Data Bases, Kyoto, Japan, pp. 91–100, Aug. 25–28, 1986 Considered abstract.

ML McAuliffe, et al., "Towards Effective and Efficient Free Space Management," 1996 ACM SIGMOD International Conference on Management of Data, Montreal, Quebec, Canada, Jun. 4–6, 1996 Considered abstract.

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995 Considered abstract.

Ki Sik Pang, et al., "An Efficient Recovery Scheme For Large Data in Multimedia DBMS," Journal of the Korea Information Science Society, vol. 22, No. 2, pp. 206–217, Feb. 1995 Considered abstract.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994 Considered abstract.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

Dr. Michael Stonebraker, "The Empire Strikes Back: DB2 Universal Database," http://ww.oreview.com/9704side.htm, pp. 1–7, 1997.

GH Sokut, "A Method For On–Line Reorganization of a Database," IBM Systems Journal, vol.. 36, No. 3 pp. 411–436, 1997 Considered abstract.

H. Koide, et al., "A New Memory Allocation Method For Shared Memory Multiprocessors With Large Virutal Address Space," Concurrency: Practice and Experience, vol. 9, No. 9, pp. 897–914, Sep. 1997 Considered abstract.

* cited by examiner

| | |
|---|---|
| LOB data page 000100 | 7377 bytes |
| LOB data page 000101 | 8472 bytes |
| LOB data page 000103 | 8277 bytes |
| LOB data page 000104 | 8717 bytes |
| LOB data page 000105 | 7157 bytes |

400 — LOB Map Page
402, 404, 406, 408, 410

FIG. 5

STORING THE UNCOMPRESSED DATA LENGTH IN A LOB MAP TO SPEED SUBSTRING ACCESS WITHIN A LOB VALUE

PROVISIONAL APPLICATION

This application claims the benefit of U.S. Provisional Application Ser. No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following copending and commonly-assigned patent applications:

Application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al.;

Application Ser. No. 09/321,675, entitled "A FAST TECHNIQUE FOR RECOVERING AN INDEX ON AN AUXILIARY TABLE," filed on same date herewith, by Robert W. Lyle et al.;

Application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

Application Ser. No. 09/322,317, entitled "AN OPTIMIZED TECHNIQUE FOR PREFETCHING LOB TABLE SPACE PAGES," filed on same date herewith, by Charles R. Bonner et al.;

Application Ser. No. 09/322,286, entitled "A TECHNIQUE FOR CREATING A UNIQUE QUASI-RANDOM ROW IDENTIFIER," filed on same date herewith, by Robert W. Lyle et al.;

Application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.;

Application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al.; and Application Ser. No. 09/322,316, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to retrieving and processing large object data by using a stored data length in a computer.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables, are stored on DASD, such as magnetic or optical disk drives for semi-permanent storage.

A table space can be a system managed space (e.g., an operating system file system) or a database managed space. Each table space is physically divided into equal units called pages. Each page, which may contain, for example, 4K bytes, holds one or more rows of a table and is the unit of input/output (I/O). The rows of a table are physically stored as records on a page. A record is always fully contained within a page and is limited by page size.

Traditionally, a DBMS stored simple data, such as numeric and text data. In a traditional RDBMS, the underlying storage management has been optimized for simple data. More specifically, the size of a record is limited by the size of a data page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, may take up a great deal of storage space. As a result, users frequently compress LOB data. Compressed LOB data takes up less storage space and fits within fewer pages.

DBMSs use a variety of models to retrieve compressed LOB data. The models typically force decompression of the compressed LOB data to determine where a particular byte or range of bytes are stored within the LOB table space. Such decompression may lengthen the time of processing LOB data. For example, the RDBMS has a number of built-in functions that simplify or automate some types of data processing. Typical built-in functions include column functions and scalar functions. A column function returns a single value as a result. An average (AVG) function is an example of a column function. The AVG function calculates the average of a column value for multiple rows. Like a column function, a scalar function produces a single value as a result. However, a column function operates on one column for multiple rows and a scalar function operates on one column in a single row. A substring function is an example of a scalar function. The substring function enables a user to extract a portion of the LOB data.

Processing compressed LOB data is generally slow. Before processing can begin, the LOB data is decompressed to determine where a particular byte or range of bytes are stored within the LOB data. Decompression consumes a considerable amount of elapsed time. Therefore, there is a need in the art for an improved technique for accessing decompressed data.

SUMMARY OF THE INVENTION

To overcome the limitations in the prior art described above, and to overcome other limitations that will become apparent upon reading and understanding the present specification, the present invention discloses a method, apparatus, and article of manufacture for retrieving data in a computer.

In accordance with the present invention, large object data is compressed until the large object data fits within one data page. An uncompressed large object data length is stored in a large object map, wherein the stored uncompressed large object data length is associated with the compressed large object data. A portion of the compressed large object data is located for performing a data processing function by using the stored uncompressed large object data length. The portion of the large object data is stored in the database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
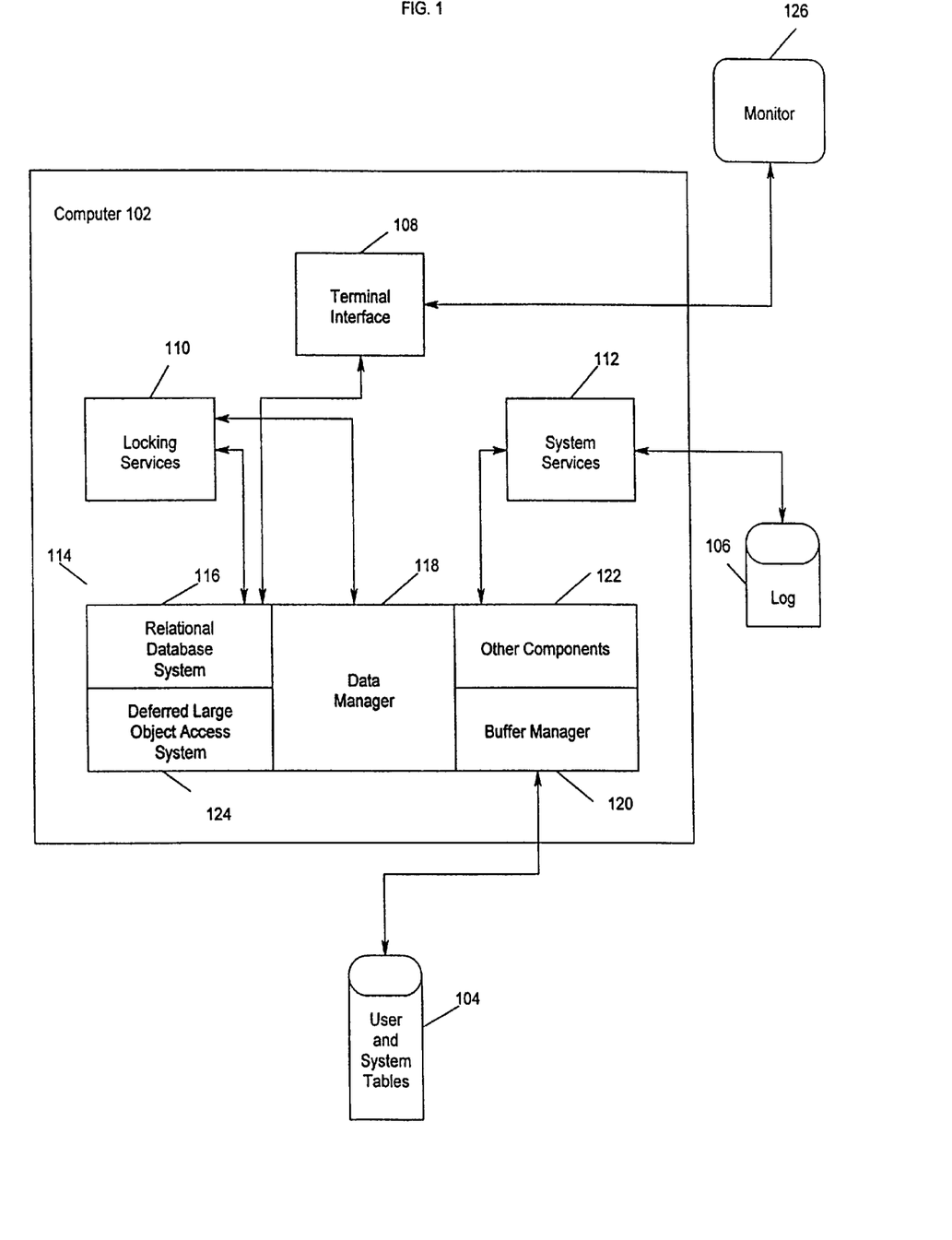
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Storage Model System 124, and other components 122 such as an SQL compiler/interpreter. These submodules support the functions of the SQL language, i.e. definition, access control, interpretation, compilation, database retrieval, and update of user and system data. The storage model system 124 works in conjunction with the other submodules to store an uncompressed data length within a LOB map page and decrease the time it takes to retrieve and process LOB data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Storing a LOB Data Length

Figure 2:
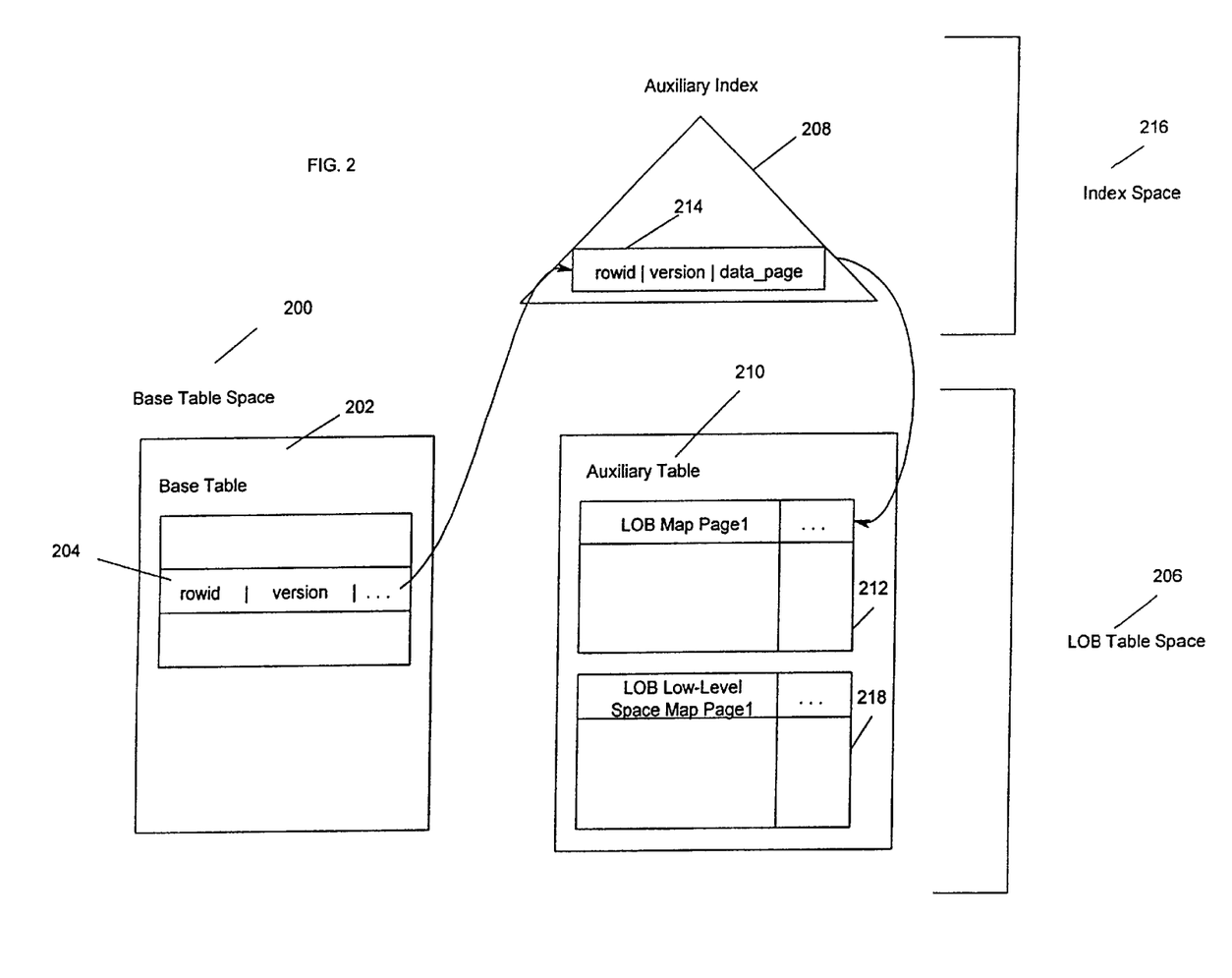
FIG. 2 is a block diagram illustrating an exemplary base table space and LOB table space.

The storage model system 124 of the present invention stores information about the physical location of the LOB data. The storage model system 124 stores this information within a LOB map page in a LOB table space. For compressed LOB data, the storage model system 124 stores the number of bytes that are stored within each LOB data page before compression. By storing the number of bytes actually stored within the LOB data page (not the compressed number of bytes), built-in functions, such as the substring function, do not need to decompress LOB data up to a specified substring starting point. Instead, the storage model system 124 reads the LOB map page and performs simple arithmetic to find the first page that a substring begins and ends on. The LOB data is only decompressed after the storage model system 124 locates a particular byte or range of bytes stored within the LOB table space FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version"), and other columns (indicated with the ellipses). The prefetch system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The prefetch system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page1 218. LOB low-level space map pages assist in allocating and deallocating LOB pages. A high-level space map identifies the low-level space map pages.

Figure 3:
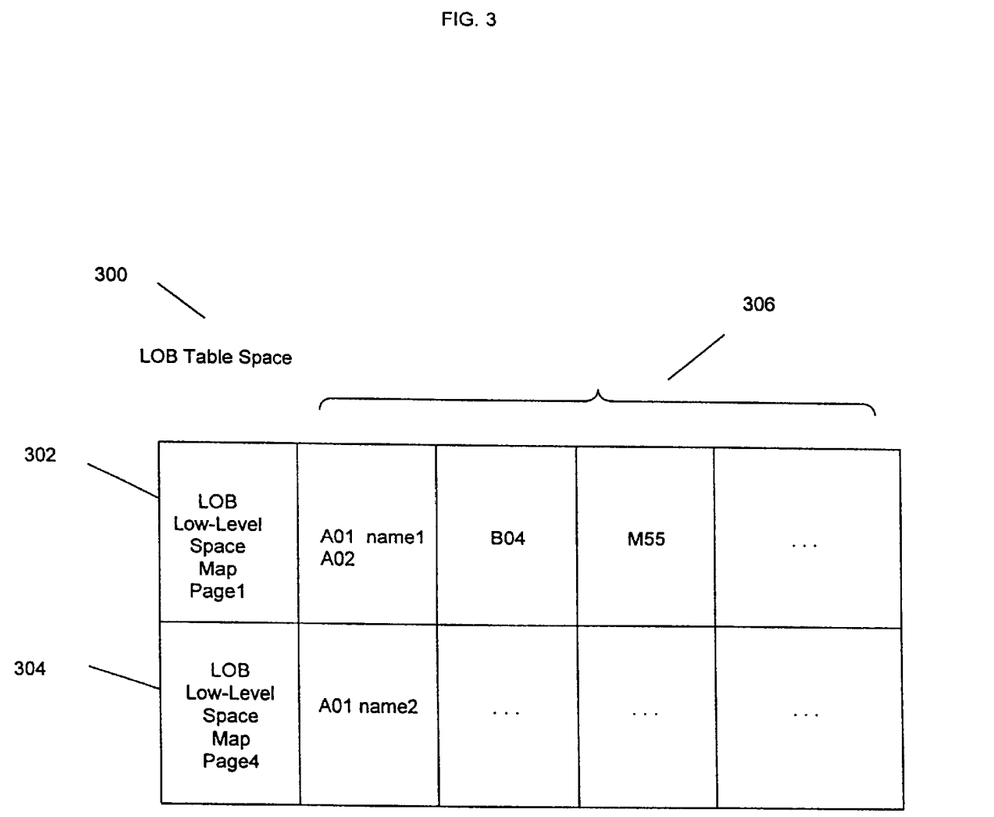
FIG. 3 is a block diagram illustrating an exemplary table space containing LOB low-level space map pages and data pages.

FIG. 3 is a block diagram illustrating an exemplary table space containing LOB low-level space map pages and LOB data pages. A table space 300 contains a number of LOB low-level space map pages 302, 304. Each LOB low-level space map page 302, 304 covers a number of LOB data pages 306. Each LOB data page is allocated to one LOB, even if the LOB uses only a portion of the LOB data page. For example, one LOB may be stored on 17 and a half LOB data pages, but the LOB data page that is half used is not allocated to any other LOB. Each LOB low-level space map page 302, 304 covers a fixed range of LOB data pages 306. A LOB low-level space map page 302, 304 identifies the LOB data pages 306 that have not yet been allocated to a LOB. When inserting a LOB, one or more LOB low-level space map pages 302, 304 are accessed to find LOB data pages that may be allocated to the LOB. All LOB data pages within a single table space have the same page size. A page may contain, for example, 4096 bytes.

The storage model system 124 works in conjunction with the data manager 118 when storing and retrieving LOB data. First, the data manager 118 receives uncompressed LOB data. Second, the data manager 118 compresses the LOB data into pieces, so that the result of the compressed LOB data takes up less storage space and fits within one of the pages. The data manager 118 compresses the LOB data to store as many bytes as it can within one page. Thus, the data manager 118 stores the largest number of uncompressed bytes that can logically fit within a page. Third, the storage model system 124 stores the uncompressed LOB data length in a LOB map page. Page sizes range from 4K to 32K, and the available free space is slightly less than the page size, due to control information. The storage model system 124 keeps track of how many bytes are required to create the compressed LOB data to fill the available free space on the LOB data page 306.

When retrieving the compressed LOB data, the storage model system 124 locates where, within the LOB table space, the bytes are stored. The storage model system 124 uses the uncompressed data length to determine the location of the bytes. After the storage model system 124 locates the bytes, the data manager 118 decompresses the bytes. Note, the storage model system 124 decreases the time it takes to process LOB data because only a portion of the LOB data (instead of all the LOB data) is decompressed.

For example, assume a 4000 byte block is available on a LOB data page 306 and assume that a data manager 118 receives 8000 bytes of uncompressed LOB data. The data manager 118 then compresses 8000 bytes of LOB data to 4000 bytes of LOB data and stores the 4000 bytes of LOB data in a LOB data page 306. The storage model system 124 stores the uncompressed data length in a LOB map page. The LOB map page reflects the fact that, logically, the data manager 118 stored 8000 bytes within the LOB data page 306. Specifically, every entry in the LOB map page indicates exactly how many source characters are compressed to fit into a particular LOB data page 306. In a preferred embodiment of the invention, the LOB pieces stored within a LOB data page 306 (or a set of LOB data pages) end on even byte boundaries, i.e., no source characters split across LOB data pages 306. It is to be understood that odd byte boundaries, i.e., source characters split across LOB data pages 306, can be used without departing from the scope of the present invention.

Figure 4:
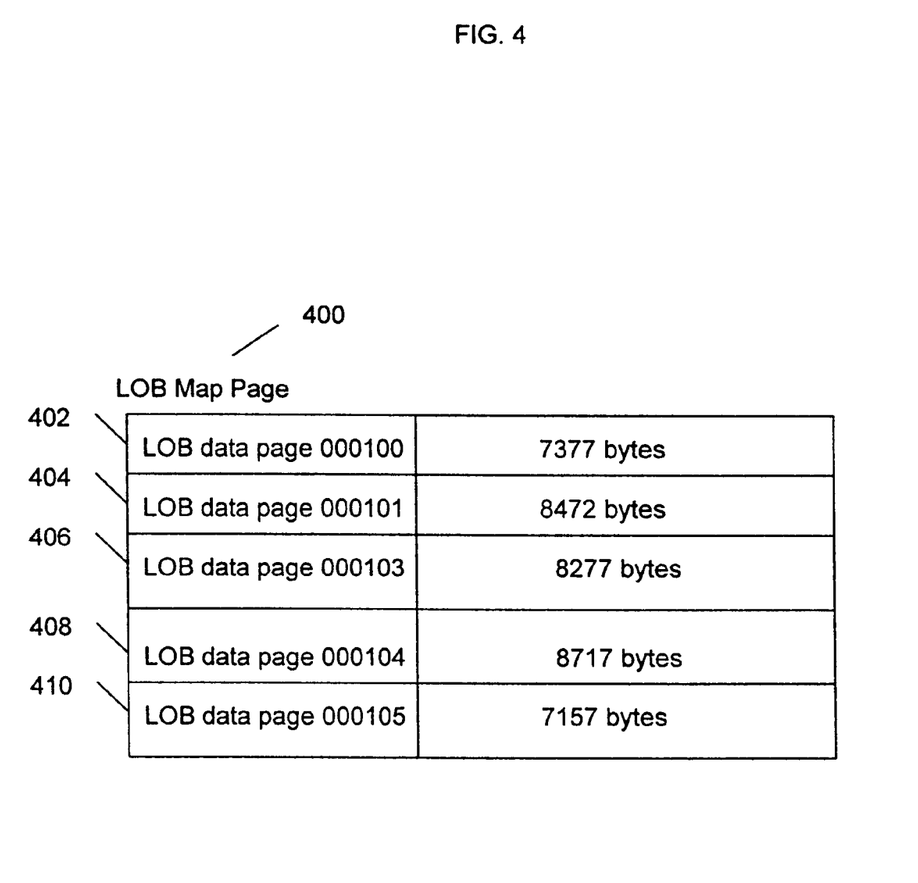
FIG. 4 is a block diagram illustrating an exemplary LOB map page.

To further illustrate the benefits of implementing the storage model system 124, an example is shown in FIG. 4. Assume a user inserts LOB data containing 40000 characters. The LOB map page 400 contains page numbers and the number of bytes contained in each page: Page (000100) 402 has 7377 bytes stored; Page (000101) 404 has 8472 bytes stored; Page (000103) 406 has 8277 bytes stored; Page (000104) 408 has 8717 bytes stored; and Page (000105) 410 has 7157 bytes stored.

In FIG. 4, the 40000 bytes of data are stored within five LOB data pages 402, 404, 406, 408, and 410. The LOB map page 400 reflects the number of bytes that are logically stored within each LOB data page 402, 404, 406, 408, and 410, even though each 4K page will only store slightly less that 4K. Assume that a user wishes to use a built-in function to process the LOB data containing 40000 characters.

More specifically, assume that the user wishes to use a substring function to read a substring of the LOB data starting at byte 36000 for 1000 bytes. Some conventional models require decompressing all bytes of the LOB data up to byte 36000 to determine where, within the compressed LOB data, byte 36000 is located. However, with the storage model system 124, decompression of the LOB data is not performed until the page that contains the first requested bytes are reached. The storage model system 124 searches the entries in the LOB map page 400, keeping track of which bytes are covered by a particular LOB data page 402, 404, 406, 408, and 410. From the LOB map page 400, the storage model system 124 can infer that page (000100) 402 contains bytes 1 to 7377 of the LOB data; page (000101) 404 contains bytes 7378 to 15849 of the LOB data; page (000103) 406 contains bytes 15850 to 24126 of the LOB data; page (000104) 408 contains bytes 24127 to 32843 of the LOB data; and page (000105) 410 contains bytes 32844 to 40000 of the LOB data. Thus, to find the substring beginning at byte 36000, the storage model system 124 knows that it should begin at page (000105) 410. The storage model system 124 also knows that the last page to be read is page (000105) 410 because byte 36999 (the last byte needed to evaluate a substring from 36000 for 1000 bytes) is also contained on page (000105) 410. Note that the storage model system 124 can use the LOB map page 400 to determine a starting point and ending point for any built-in function.

If the LOB data needed to perform a built-in function spans many pages, it is very valuable to have prefetch enabled for the LOB data pages 306. To prefetch, the storage model system 124 computes the required data page numbers that must be read to perform a built-in function, and only obtains the required data pages. Thus, users get the performance advantage that prefetch provides without paying for reading additional, unnecessary data pages. Prefetch is further described in the above cross-referenced application entitled "AN OPTIMIZED TECHNIQUE FOR PREFETCHING LOB TABLE SPACE PAGES." The storage model system 124 uses prefetch when LOB data needed to perform a built-in function is spread across more than one page. The LOB map makes this feasible even for compressed LOB data.

Figure 5:
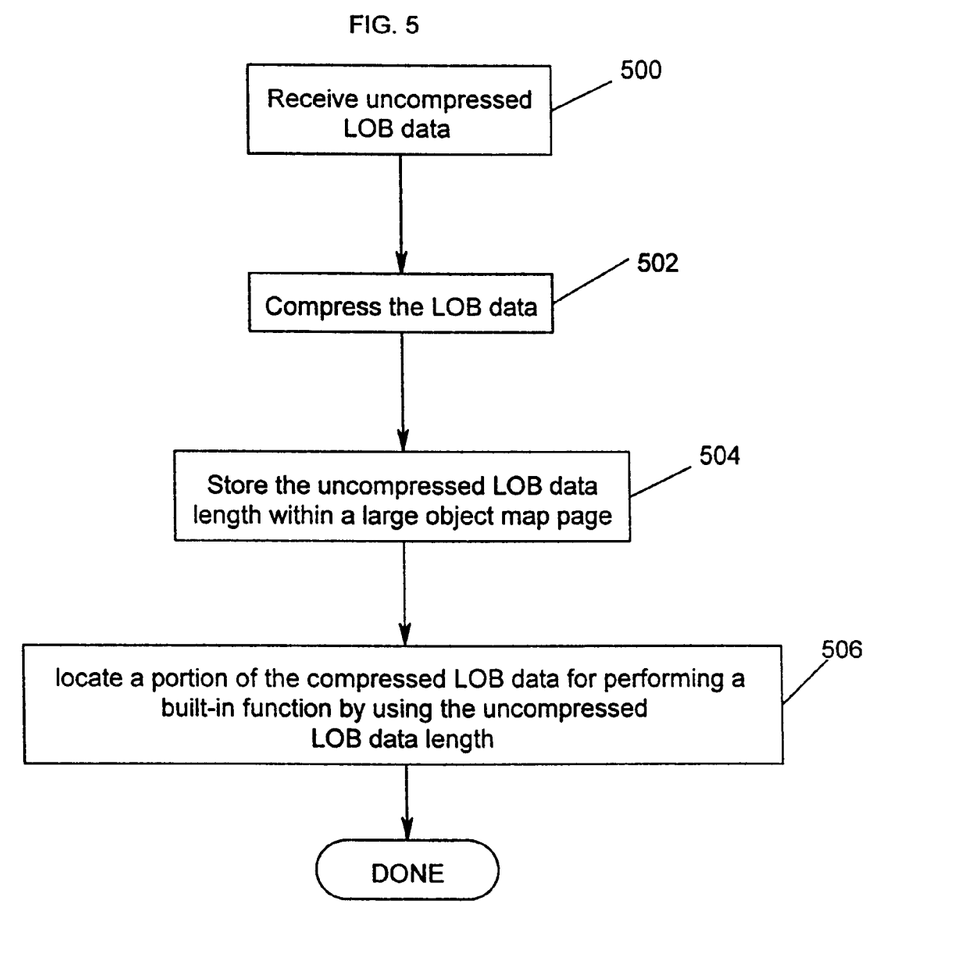
FIG. 5 is a flow diagram illustrating the steps performed by the storage model system for storing an uncompressed data length within a LOB map page and decreasing the time it takes to retrieve and process LOB data.

FIG. 5 is a flow diagram illustrating the steps performed by the storage model system 124 for storing an uncompressed data length within a LOB map page and decreasing the time it takes to retrieve and process LOB data. Block 500 represents the storage model system 124 receiving uncompressed LOB data. The storage model 124 then compresses the LOB data to store as many bytes as it can within one page, as represented by block 502. The storage model 124 then stores the uncompressed LOB data length within a LOB map page, as represented by block 504. The storage model system 124 locates a portion of the compressed LOB data for performing a built-in function by using the uncompressed LOB data length, as represented by block 506. More specifically, the storage model locates a starting point and an ending point for performing a built-in function.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of retrieving data in a computer, the data being stored in a database, wherein the database is stored on a data storage device connected to the computer, the method comprising:

compressing large object data until the compressed large object data fits within one data page;

storing an uncompressed large object data length in a large object map, wherein the uncompressed large object data length is associated with the compressed large object data; and locating a portion of the compressed large object data for performing a data processing function using the stored uncompressed large object data length, wherein the portion of the compressed large object data is stored in the database.

2. The method of claim 1, wherein the data processing function is a scalar function, and wherein the scalar function produces a single value as a result.

3. The method of claim 2, wherein the data processing function is a substring function.

4. The method of claim 1, wherein locating a portion of the compressed large object data further comprises locating a starting data page for the data processing function by counting a number of bytes stored in each page.

5. The method of claim 1, wherein locating a portion of the compressed large object data further comprises locating an ending data page for the data processing function by counting a number of bytes stored in each page.

6. The method of claim 1, the method further comprises, after locating a portion of a large object data for performing the data processing function, decompressing the large object data.

7. The method of claim 1, wherein the database contains one or more large object data pages, the method further comprises performing a page prefetch, wherein the page prefetch comprises:

identifying a portion of the large object data pages based on the stored large object data length; and fetching the identified portion of the large object data pages.

8. An apparatus for retrieving data in a computer, the data being stored in a database, comprising:

a computer having a data storage device connected thereto, wherein the data storage device stores the database;

one or more computer programs, performed by the computer for compressing large object data until the compressed large object data fits within one data page, storing an uncompressed large object data length in a large object map, wherein the uncompressed large object data length is associated with the compressed large object data, and locating a portion of the compressed large object data for performing a data processing function using the stored uncompressed large object data length, wherein the portion of the compressed large object data is stored in the database.

9. The apparatus of claim 8, wherein the data processing function is a scalar function, and wherein the scalar function produces a single value as a result.

10. The apparatus of claim 9, wherein the data processing function is a substring function.

11. The apparatus of claim 8, wherein the means performed by the computer for locating further comprises one or more computer programs for locating a starting data page for the data processing function by counting a number of bytes stored in each page.

12. The apparatus of claim 8, wherein the means performed by the computer for locating further comprises one or more computer programs for locating an ending data page for the data processing function by counting a number of bytes stored in each page.

13. The apparatus of claim 8, wherein the apparatus further comprises one or more computer programs for, after locating a portion of a large object data for performing the data processing function, decompressing the large object data.

14. The apparatus of claim 8, wherein the database contains one or more large object data pages, the apparatus further comprises one or more computer programs for performing a page prefetch, wherein the page prefetch comprises, based on the stored large object data length, means performed by the computer for identifying a portion of the large object data page, and means performed by the computer for fetching the identified portion of the large object data pages.

15. The apparatus of claim 8, wherein the one or more computer programs performed by the computer that locate a portion of the compressed large object data further comprise one or more computer programs that locate a starting data page for the data processing function by counting a number of bytes stored in each page.

16. The apparatus of claim 8, wherein the one or more computer programs performed by the computer f that locate a portion of the compressed large object data further comprise one or more computer programs that locate an ending data page for the data processing function by counting a number of bytes stored in each page.

17. The apparatus of claim 8, wherein the database contains one or more large object data pages, the apparatus further comprises one or more computer programs for performing a page prefetch, wherein the page prefetch comprises, based on the stored large object data length, one or more computer programs performed by the computer that identify a portion of the large object data page, and that fetch the identified portion of the large object data pages.

18. An article of manufacture comprising a computer program carrier readable by a computer and embodying one or more instructions executable by the computer to perform a method that retrieves data in a computer, the data being stored in a database, wherein the database is stored on a data storage device connected to the computer, the method comprising:

compressing large object data until the compressed large object data fits within one data page;

storing an uncompressed large object data length in a large object map, wherein the uncompressed large object data length is associated with the compressed large object data; and locating a portion of the compressed large object data for performing a data processing function using the stored uncompressed large object data length, wherein the portion of the compressed large object data is stored in the database.

19. The article of manufacture of claim 18, wherein the data processing function is a scalar function, and wherein the scalar function produces a single value as a result.

20. The article of manufacture of claim 19, wherein the data processing function is a substring function.

21. The article of manufacture of claim 18, wherein locating a portion of the compressed large object data further comprises locating a starting data page for the data processing function by counting a number of bytes stored in each page.

22. The article of manufacture of claim 18, wherein locating a portion of the compressed large object data further comprises locating an ending data page for the data processing function by counting a number of bytes stored in each page.

23. The article of manufacture of claim 18, the method further comprises, after locating a portion of a large object data for performing the data processing function, decompressing the large object data.

24. The article of manufacture of claim 18, wherein the database contains one or more large object data pages, the method further comprises performing a page prefetch, wherein the page prefetch comprises:

identifying a portion of the large object data pages based on the stored large object data length; and fetching the identified portion of the large object data pages.

* * * * *